US011871156B2

(12) United States Patent
Bisulco et al.

(10) Patent No.: US 11,871,156 B2
(45) Date of Patent: Jan. 9, 2024

(54) DYNAMIC VISION FILTERING FOR EVENT DETECTION

(71) Applicant: SAMSUNG ELECTRONICS CO., LTD., Suwon-si (KR)

(72) Inventors: Anthony Robert Bisulco, New York, NY (US); Fernando Cladera Ojeda, Philadelphia, PA (US); Ibrahim Volkan Isler, Saint Paul, MN (US); Daniel Dongyuel Lee, Tenafly, NJ (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 265 days.

(21) Appl. No.: 17/129,018

(22) Filed: Dec. 21, 2020

(65) Prior Publication Data
US 2021/0312189 A1 Oct. 7, 2021

Related U.S. Application Data

(60) Provisional application No. 63/004,308, filed on Apr. 2, 2020.

(51) Int. Cl.
*H04N 19/00* (2014.01)
*H04N 19/169* (2014.01)
(Continued)

(52) U.S. Cl.
CPC ......... *H04N 7/188* (2013.01); *G06F 18/2193* (2023.01); *G06T 9/002* (2013.01);
(Continued)

(58) Field of Classification Search
CPC ..... H04L 67/12; H04L 67/10; H04L 63/1425; H04L 63/1416; H04L 63/0428;
(Continued)

(56) References Cited

U.S. PATENT DOCUMENTS 5,157,659 A * 10/1992 Schenkel ............. H04L 12/407
370/447
6,157,955 A * 12/2000 Narad ................. H04L 49/9031
709/228
(Continued)

FOREIGN PATENT DOCUMENTS

CN 1345497 A * 4/2002 ............ G06F 21/52
KR 10-2017-0090347 A 8/2017
(Continued)

OTHER PUBLICATIONS

Search machine translation: System And Method For Providing Data Security of CN 1345497 A to FRIEDMAN, retrieved Feb. 22, 2023, 74 pages. (Year: 2023).*
(Continued)

*Primary Examiner* — Matthew C Bella
*Assistant Examiner* — Dennis Rosario
(74) *Attorney, Agent, or Firm* — Sughrue Mion, PLLC

(57) ABSTRACT

A detection system includes a filter and a detector. The filter receives input packets from one or more dynamic vision sensors (DVSs) deployed in an area. The filter reduces the bandwidth of the input packets to produce compressed data packets while maintaining good end-to-end detection capability. The compressed data packets are transmitted to a detector in a low bandwidth transmission. The detector may collect compressed data packets from many filters. The detector determines if an object of interest is represented in the information of the input packets. If an object of interest is present, the detector activates an alarm, sends a notification to a person associated with the area and/or stores an indication in a database.

9 Claims, 15 Drawing Sheets

(51) Int. Cl.
| | |
|---|---|
| *H04N 19/14* | (2014.01) |
| *G06V 20/40* | (2022.01) |
| *H04N 7/18* | (2006.01) |
| *G06T 9/00* | (2006.01) |
| *H04L 43/04* | (2022.01) |
| *H04L 43/028* | (2022.01) |
| *G06V 20/52* | (2022.01) |
| *G06V 40/20* | (2022.01) |
| *G06F 18/21* | (2023.01) |
| *G06V 10/10* | (2022.01) |
| *G06V 10/764* | (2022.01) |
| *G06V 10/147* | (2022.01) |
| *H04N 25/47* | (2023.01) |

(52) U.S. Cl.
CPC ............ *G06V 10/10* (2022.01); *G06V 10/147* (2022.01); *G06V 10/764* (2022.01); *G06V 20/44* (2022.01); *G06V 20/52* (2022.01); *G06V 40/25* (2022.01); *H04L 43/028* (2013.01); *H04L 43/04* (2013.01); *H04N 7/181* (2013.01); *H04N 19/00* (2013.01); *H04N 19/14* (2014.11); *H04N 19/188* (2014.11); *H04N 25/47* (2023.01)

(58) Field of Classification Search
CPC ....... H04L 43/106; H04L 41/00; H04L 65/60; H04L 63/06; H04L 45/00; H04L 63/04; H04L 47/32; H04L 43/0894; H04L 47/31; H04L 7/0087; H04L 5/0044; H04L 1/0008; H04L 1/0084; H04L 47/27; H04L 65/70; H04L 65/75; H04L 2012/5652; H04L 2212/00; H04L 43/0835; H04L 47/115; H04L 47/35; H04L 63/0485; H04L 65/00; H04L 1/1664; H04L 12/08; H04L 12/40071; H04L 45/26; H04L 45/566; H04L 47/26; H04L 47/564; H04L 69/00; H04W 4/38; H04W 28/065; H04W 12/106; H04W 76/16; H04W 28/0242; H04W 52/0222; G06F 21/64; G06F 21/554; G06F 9/30036; G06F 21/566; G06F 2201/88; G06F 3/04845; G06F 11/1004; G06T 7/20; G06T 2207/10016; G06T 2207/30242; G06T 2207/20024; G06T 9/00; G06T 11/203; G06T 7/11; G06T 7/10; G06T 7/246; G06T 2207/30232; G06T 2207/20192; H04N 21/4305; H04N 19/44; H04N 19/00; H04N 19/46; H04N 19/117; H04N 19/42; H04N 19/80; H04N 21/454; H04N 9/8042; H04N 21/43632; H04N 21/6118; H04N 21/6168; H04N 19/70; H04N 21/23605; H04N 21/236; H04N 21/23608; H04N 21/4344; H04N 13/194; H04N 19/184; H04N 19/188; H04N 21/4345; H04N 21/64792; H04N 25/76; H04N 25/766; H04N 25/47; H04N 7/188; H04N 21/238; H04N 25/44; H04N 23/70; H04N 23/71; H04N 25/70; H04N 25/78; H04N 25/779; H04N 25/77; H04N 25/778; H04N 25/773; H04N 25/772; H04N 25/771; H04N 19/14; H04N 19/169; H04N 19/17; H04N 19/176; H04N 23/00; H04N 23/10; H04N 5/38; H04N 5/44; H04N 7/183; H04N 7/185; H04N 7/186; H04N 7/181; H04N 7/025; H04N 7/04; H04N 7/06; H04N 7/063; H04N 7/08; H04N 7/081; H04N 7/10; H04N 7/22; H04N 7/24; H04N 7/52; G06V 20/44; G06V 20/58; G06V 40/103; G06V 10/147; G06V 20/52

See application file for complete search history.

(56) References Cited

U.S. PATENT DOCUMENTS

| | | | |
|---|---|---|---|
| 10,198,660 | B2 | 2/2019 | Ji et al. |
| 10,262,226 | B1* | 4/2019 | Flowers ............... G06V 20/597 |
| 10,445,924 | B2 | 10/2019 | Shi et al. |
| 10,972,691 | B2 | 4/2021 | Yeo |
| 2009/0009340 | A1* | 1/2009 | Weaver ................... G01D 21/00 |
| | | | 340/573.1 |
| 2013/0156337 | A1 | 6/2013 | Kwon et al. |
| 2014/0125994 | A1 | 5/2014 | Kim et al. |
| 2014/0363049 | A1* | 12/2014 | Benosman ............... G06T 7/269 |
| | | | 382/103 |
| 2017/0213105 | A1 | 7/2017 | Ji et al. |
| 2018/0137673 | A1 | 5/2018 | Shi et al. |
| 2019/0364237 | A1 | 11/2019 | Yeo et al. |
| 2019/0370940 | A1 | 12/2019 | Choi et al. |
| 2023/0125031 | A1* | 4/2023 | Xavier ................. H04N 25/771 |
| | | | 348/307 |

FOREIGN PATENT DOCUMENTS

| | | |
|---|---|---|
| KR | 10-2018-0054487 A | 5/2018 |
| KR | 10-2019-0133952 A | 12/2019 |

OTHER PUBLICATIONS

Bolton et al., Application of Hierarchical Clustering for Object Tracking with a Dynamic Vision Sensor, Jun. 8, 2019 [retrieved Feb. 22, 2023], International Conference on Computational Science 2019, Lecture Notes in Computer Science, vol. 11540, pp. 164-176. Retrieved: (Year: 2019).*

[item V continued] https://link.springer.com/chapter/10.1007/978-3-030-22750-0_13 (Year: 2019).*

Tsakiris, Enabling Gigabit IP for Embedded Systems, captured Wayback Machine on Mar. 19, 2017, file created Feb. 16, 2009 [retrieved Feb. 22, 2023], Finders University, 151 pages. Retrieved: (Year: 2017).*

[item X continued] https://web.archive.org/web/20170319045158/ https://flex.flinders.edu.au/file/31b871e9-9838-4d6a-b63e-76e69c288b62/1/Thesis-Tsakiris-2009.pdf (Year: 2017).*

Chen et al., Efficient Feedforward Categorization of Objects and Human Postures with Address-Event Image Sensors, Jun. 9, 2011 [retrieved Feb. 22, 2023], IEEE Transactions on Pattern Analysis and Machine Intelligence, vol. 34, Issue: 2, pp. 302-314. Retrieved: (Year: 2011).*

[item V continued] https://ieeexplore.ieee.org/abstract/document/5871650 (Year: 2011).*

Chi et al., Video Sensor Node for Low-Power Ad-hoc Wireless Networks, Mar. 14-16, 2007 [retrieved Feb. 22, 2023], 2007 41st Annual Conference on Information Sciences and Systems, pp. 244-247. Retrieved: https://ieeexplore.ieee.org/abstract/document/4298307 (Year: 2007).*

Serre et al., Robust Object Recognition with Cortex-Like Mechanisms, Jan. 22, 2007 [retrieved Feb. 22, 2023], IEEE Transactions on Pattern Analysis and Machine Intelligence, vol. 29, Issue: 3, pp. 411-426. Retrieved: https://ieeexplore.ieee.org/abstract/document/4069258 (Year: 2007).*

Isler, Algorithms for Distributed and Mobile Sensing [Dissertation], 2004 [retrieved Feb. 22, 2023], University Pennsylvania, 199 pages. Retrieved: https://www.proquest.com/pagepdf/305146409?accountid=14753&parentSessionId=q2UNvRQI513UdCXEpHIYVCGqy5Bo4GAI4PBScVgzVHs%3D (Year: 2004).*

(56) References Cited

OTHER PUBLICATIONS

Mhatre et al., Design guidelines for wireless sensor networks: communication, clustering and aggregation, Jan. 2004 [retrieved Feb. 22, 2023], Ad Hoc Networks, vol. 2, Issue 1, pp. 45-63. Retrieved: https://www.sciencedirect.com/science/article/pii/S1570870503000477 (Year: 2004).*

Lakhani, Modified JPEG Huffman coding, Feb. 2003 [retrieved Feb. 22, 2023], IEEE Transactions on Image Processing, vol. 12, Issue: 2, pp. 159-169. Retrieved: https://ieeexplore.ieee.org/abstract/document/1192978 (Year: 2003).*

International Search Report (PCT/ISA/210) and Written Opinion (PCT/ISA/237) dated Jul. 1, 2021 by the International Searching Authority in counterpart International Patent Application No. PCT/KR2021/003294.

* cited by examiner

Integer Input    Binary Weights    Operations

+

−

Binary Input    Binary Weights    Operations

AND,
POPCNT

DYNAMIC VISION FILTERING FOR EVENT DETECTION

CROSS REFERENCE TO RELATED APPLICATION

This application claims benefit of priority of U.S. Provisional Application No. 63/004,308 filed Apr. 2, 2020 the contents of which are hereby incorporated by reference.

FIELD

The present disclosure is related to an apparatus and method for capturing event-triggered image information, compressing it, and conveying the compressed information for detection.

BACKGROUND OF THE INVENTION

A dynamic vision sensor (DVS) differs from conventional frame cameras: Instead of capturing images at a fixed rate, a DVS asynchronously measures per-pixel brightness changes, and outputs a stream of events. In the stream is information about the time, location and sign of the brightness changes.

A problem exists for cameras which are always on, including a DVS capturing event-triggered image information. For example, there are bandwidth and energy problems for a camera which is always on. The camera may be in a system intended to allow recognition of an unexpected person, animal or thing in an area. A high amount of data may be generated by the camera for events which are not of interest.

The inventors of the present application have identified a problem that a camera and detection system in an always-on configuration may consume a high amount of power and bandwidth. The inventors recognize that, in order to deploy many DVS's, the power consumption should be low and the number of bits from the events should contain as little unnecessary information for detection as possible.

SUMMARY OF THE INVENTION

Provided herein is a filter configured to perform a method including receiving a plurality of input packets from a dynamic vision sensor (DVS); generating a plurality of intermediate sequences based on the plurality of input packets; obtaining a packet payload based on event counts of the plurality of thickened edges; and transmitting, to a detector, a compressed data packet, wherein the compressed packet is based on the packet payload.

In some embodiments of the filter the obtaining comprises applying a Huffman code to the intermediate sequences.

Also provided herein is a detector configured to perform a method including receiving a plurality of compressed data packets; obtaining an input filter matrix by applying a code table to the plurality of compressed data packets; generating a plurality of feature values by applying neural network weights of a neural network to the input filter matrix; generating a detection result using a max pool operation followed by a counting operation to the plurality of feature values; and generating an alarm and/or storing an indication in a database based on the detection result. The detection result, in some embodiments, is transmitted to a person concerned with the area in which the event has occurred.

In some embodiments of the detector, the code table and the neural network weights have been trained to retain information associated with images of a human pedestrian.

Also provided herein is a non-transitory computer readable medium configured to store instructions, wherein the instructions are configured to cause one or more processors to execute the method of the filter.

Also provided herein is a non-transitory computer readable medium configured to store instructions, wherein the instructions are configured to cause one or more processors to execute the method of the detector.

Also provided herein is a filter device including: a sensor input configured to receive a plurality of input packets from a dynamic vision sensor (DVS); a coincidence detection circuit configured to: receive a plurality of pixel values, wherein the plurality of pixel values are based on the plurality of input packets, detect a plurality of horizontal coincidence values, detect a plurality of vertical coincidence values, and output the plurality of horizontal coincidence values and the plurality of vertical coincidence values; an aggregation circuit configured to: downsample the plurality of horizontal coincidence values to obtain a plurality of downsampled horizontal values, integrate the plurality of downsampled horizontal values to generate a plurality of horizontal event values, downsample the plurality of vertical coincidence values to obtain a plurality of downsampled vertical values, and integrate the plurality of downsampled vertical values to generate a plurality of vertical event values; and a transmitter configured to output a compressed data packet, wherein the compressed packet is based on the plurality of horizontal event values and the plurality of vertical event values.

In some embodiments, the filter device further includes a Huffman coder and a code table, the Huffman coder is configured to output a coded packet based on: the code table, the plurality of horizontal event values, and the plurality of vertical event values, and wherein the compressed data packet is based on the coded packet.

In some embodiments, the filter device further includes a wired interface, wherein the wired interface is configured to output the compressed data packet including a first preamble, the coded packet, and a first checksum.

In some embodiments, the filter device further includes a wireless interface, wherein the wireless interface is configured to output the compressed data packet including a second preamble, the coded packet, and a second checksum.

In some embodiments, the filter device further includes an event parser, the event parser is configured to: determine a plurality of pixel values based on the plurality of input packets, and output the plurality of pixel values to the coincidence detection circuit, and wherein a first pixel value of the plurality of pixel values includes an x value, a y value and a p value.

Also provided herein is a detection device including: a packet input configured to receive a compressed data packet; a decoder configured to: extract a coded packet from the compressed data packet, and decode the coded packet to obtain a plurality of horizontal event values and a plurality of vertical event values; a neural network, wherein the neural network includes a plurality of neural network weights, the neural network configured to: obtain a plurality of summands based on the plurality of horizontal event values and the plurality of vertical event values, and obtain a plurality of feature values; and a detection circuit configured to: generate a detection statistic based on the plurality of feature values, compare the detection statistic with a threshold, and output a positive person-detection signal when the detection signal exceeds the threshold.

In some embodiments of the detection circuit, the neural network is configured to obtain the plurality of feature values in part by performing a non-linear operation on the plurality of summands.

In some embodiments of the detection circuit, the neural network is configured to obtain the plurality of feature values in part by: reordering the plurality of horizontal event values and the plurality of vertical event values to obtain a two dimensional input filter matrix, weighting, using first neural network weights of the plurality of neural network weights, the two dimensional input filter matrix to obtain an intermediate two dimensional output filter matrix, and summing over the intermediate two dimensional output filter matrix to obtain the plurality of summands.

In some embodiments of the detection device, the neural network is configured to obtain the plurality of feature values in part by: repeating the weighting of the two dimensional input filter matrix with successive weights of the plurality of neural network weights to obtain successive two dimensional output filter matrices, and repeating the summing over successive intermediate two dimensional output filter matrices to obtain the plurality of summands.

In some embodiments of the detection device, the decoder is further configured to format the plurality of horizontal event values and the plurality of vertical event values in an array for processing by the neural network.

In some embodiments of the detection device, the non-linear operation includes a max pool operation.

Also provided herein is a detection system including: a plurality of dynamic vision sensor (DVS) devices including a first DVS device, the plurality of DVS devices located in a first home; a plurality of filter devices a filter device of the plurality of filter devices being the filter device described above; a compute node, wherein the compute node is comprised in an electronics apparatus associated with the first home, wherein the compute node includes the detection device of claim 7, wherein the compute node is configured to: asynchronously receive, over a local area network (LAN) of the first home a plurality of compressed data packets from the plurality of filter devices, process the plurality of compressed data packets to obtain a detection result, and output an alarm based on the detection result and/or store an indication of the detection result in a database.

In some embodiments of the detection system, a first filter of the plurality of filters includes a first storage, and the first storage is configured to store a first codebook.

In some embodiments of the detection system, the neural network weights are configured to detect a human, an animal, or an object.

In some embodiments of the detection system, the animal is a dog, the plurality of DVS devices includes a first plurality of DVS devices outside of a room of a building and a second plurality of DVS devices inside the room of the building, and the neural network weights are configured to detect the dog leaving the room of the building.

Also provided herein is a detection system including: a plurality of dynamic vision sensor (DVS) devices including a first DVC device located in a first home; a plurality of filter devices, a filter device of the plurality of filter devices being the filter device described above; a compute node, wherein the compute node is located in a computing cloud and the compute node includes the detection device described above, wherein the compute node is configured to: asynchronously receive, over a wide area network (WAN) a plurality of compressed data packets from the plurality of filter devices, process the plurality of compressed data packets to obtain a detection result, and output an alarm based on the detection result and/or store an indication of the detection result in a database.

In some embodiments of the detection system detection system is further configured to: process the plurality of compressed data packets using a preprocessing module to obtain intermediate data indexed over a plurality of source DVS devices each source DVS device associated with one of a plurality of geographic locations each geographic location of the plurality of geographic locations associated with a respective label of a plurality of labels, decode the intermediate data, generate a plurality of detection statistics based on the intermediate data, associate the plurality of labels with the plurality of detection statistics, compare the plurality of detection statistics with a plurality of thresholds to obtain a plurality of detection results, and for those detection results indicating an alarm, output an alarm to a respective geographic location associated with the respective label.

Also provided herein is a filter device including: a coincidence detector; and an aggregator, wherein the coincidence detector is configured to operate on 2 bit numbers across a line buffer to obtain thickened edges by applying an and operation across the 2 bit numbers to obtain a map, wherein a value in the map is 1 if the result of the logical operation is greater than 0, and wherein the aggregator is configured to receive the map as an input and integrate over multiple time windows to obtain intermediate sequences using a window counter and an event counter.

In some embodiments of the filter device, the window counter is configured to count the number of DVS windows received at the aggregator, the event counter is configured to count the number of unique (x,y) values received at the aggregator, and the aggregator is further configured to store incoming events in a block memory, wherein if a cell representing a pixel in the block memory is already, the event count for this pixel will not be incremented.

In some embodiments of the filter device, the aggregator is reset if the number of windows without event exceeds five.

In some embodiments of the filter device, the aggregator is further configured to transmit a compressed data packet if the number of events exceeds a count of 1000.

Also provided herein is a method including: receiving a plurality of input packets from a dynamic vision sensor (DVS); generating a plurality of intermediate sequences based on the plurality of input packets; obtaining a packet payload based on event counts of the plurality of thickened edges; and transmitting, to a detector, a compressed data packet, wherein the compressed packet is based on the packet payload.

In some embodiments of the method, the obtaining includes applying a Huffman code to the intermediate sequences.

Also provided herein is a method including: receiving a plurality of compressed data packets; obtaining an input filter matrix by applying a code table to the plurality of compressed data packets; generating a plurality of feature values by applying neural network weights of a neural network to the input filter matrix; generating a detection result using a max pool operation followed by a counting operation to the plurality of feature values; and generating an alarm and/or storing an indication in a database based on the detection result.

In some embodiments of the method, the code table and the neural network weights have been trained to retain information associated with an image of a human pedestrian.

Also provided herein is a non-transitory computer readable medium configured to store instructions, wherein the instructions are configured to cause one or more processors to execute any of the methods given herein.

BRIEF DESCRIPTION OF THE DRAWINGS

The text and figures are provided solely as examples to aid the reader in understanding the invention. They are not intended and are not to be construed as limiting the scope of this invention in any manner. Although certain embodiments and examples have been provided, it will be apparent to those skilled in the art based on the disclosures herein that changes in the embodiments and examples shown may be made without departing from the scope of this invention.

DETAILED DESCRIPTION

A description of example embodiments is provided on the following pages.

The text and figures are provided solely as examples to aid the reader in understanding the invention. They are not intended and are not to be construed as limiting the scope of this invention in any manner. Although certain embodiments and examples have been provided, it will be apparent to those skilled in the art based on the disclosures herein that changes in the embodiments and examples shown may be made without departing from the scope of this invention.

System 1-20, Filter 1-5 and Detector 1-7

Figure 1A:
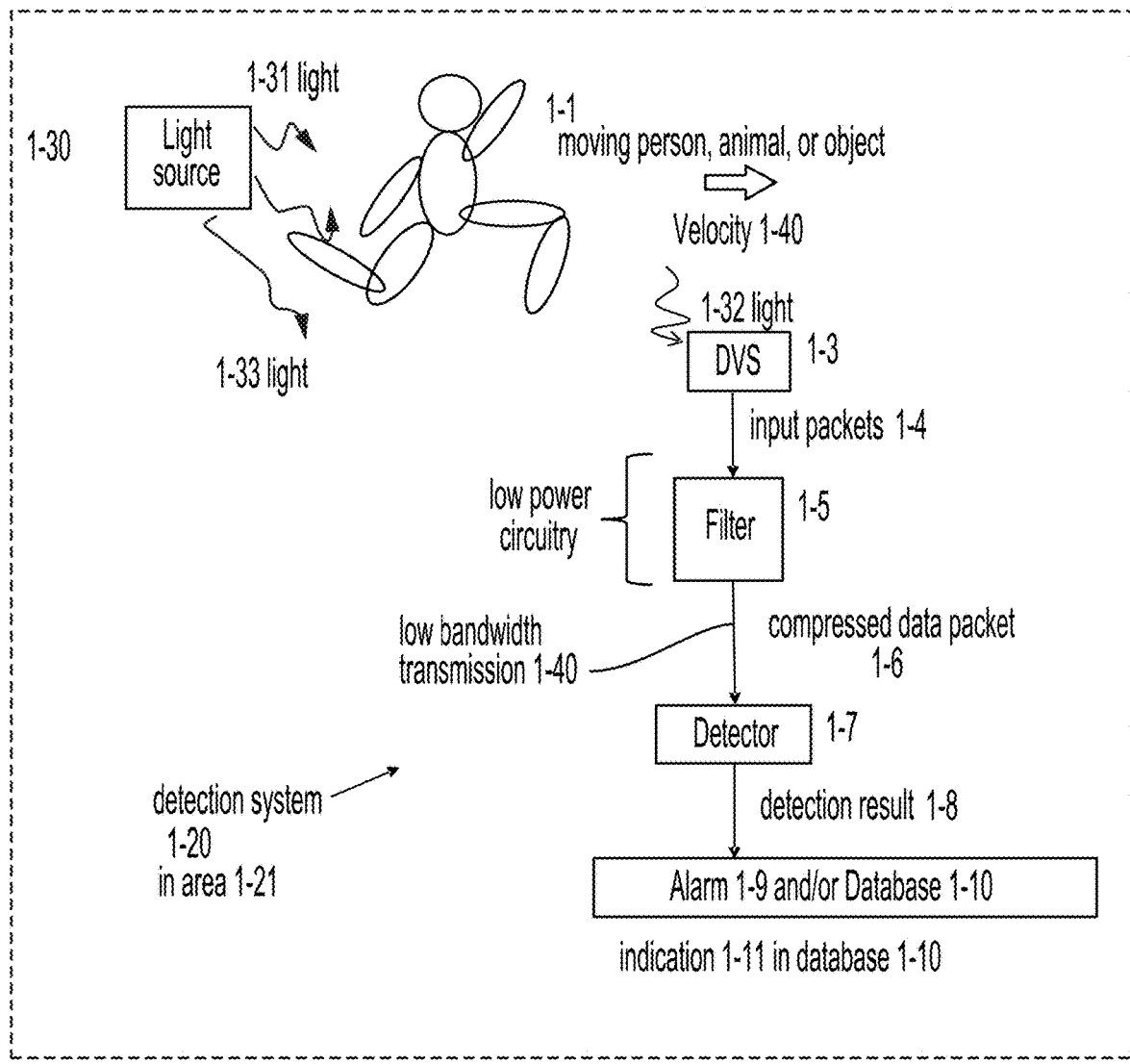
FIG. 1A illustrates a detection system 1-20 including filter 1-5 and detector 1-7 in an area 1-21, according to some embodiments.

FIG. 1A illustrates a system 1-20 which can recognize a moving person, animal or object 1-1 in an area 1-21. The system includes a dynamic vision sensor (DVS) 1-3, a filter 1-5, a detector 1-7 and a detection result 1-8.

Light from any source, for example light source 1-30 may be present in the area 1-21 in which 1-1 and the system 1-20 exist. In some embodiments, the detector 1-7 is positioned remotely outside the area 1-21 (see FIG. 4B). As an example, light 1-31, 1-32 and 1-33 are illustrated in FIG. 1.

Light 1-32 which has been affected by 1-1 may enter DVS 1-3. DVS 1-3 generates information based on changes in light intensity over time. DVS 1-3 is always on.

Figure 8:
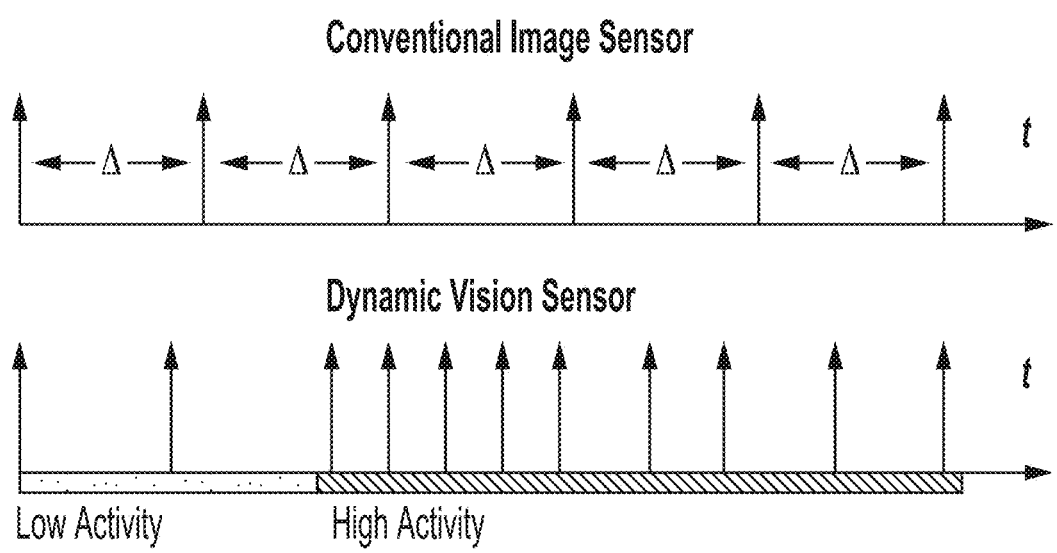
FIG. 8 illustrates event sequences from a conventional image sensor in comparison to a dynamic vision sensor, according to some embodiments.

DVS 1-3 detects the light 1-32 over time and outputs input packets 1-4. Outputs from the DVS 1-3 are in general bursty or asynchronous (not continuous at fixed intervals, see FIG. 8). Thus, even though DVS 1-3 is always on, input packets 1-4 do not emerge from DVS 1-3 continuously.

Filter 1-5 receives the input packets 1-4 and provides one or more compressed data packets 1-6 to the detector 1-7. Detailed operations of filter 1-5 will be described below.

Detector 1-7 receives one or more compressed data packets 1-6 and outputs a detection result 1-8. Detailed operations of detector 1-7 will be described below.

The detection result 1-8, in some embodiments, generates an alarm 1-9 such as notifying a person that the detection system 1-20 has detected a moving person, animal or object 1-1 in the area 1-21 of the detection system 1-20.

The detection result 1-8, in some other embodiments, causes an indication 1-11 to be stored in a database 1-10. The indication includes information indicating that that the detection system 1-20 has detected a moving person, animal or object 1-1 in the area 1-21 of the detection system 1-20. The database 1-10, in some embodiments, is configured to send a notice to a person associated with the area 1-21 (for example, a homeowner of the area 1-21 or office manager of the area 1-21). The notice may be sent on an event-driven basis (for example at the time of the detection result 1-8) or at fixed intervals (for example, once a day).

Figure 1B:
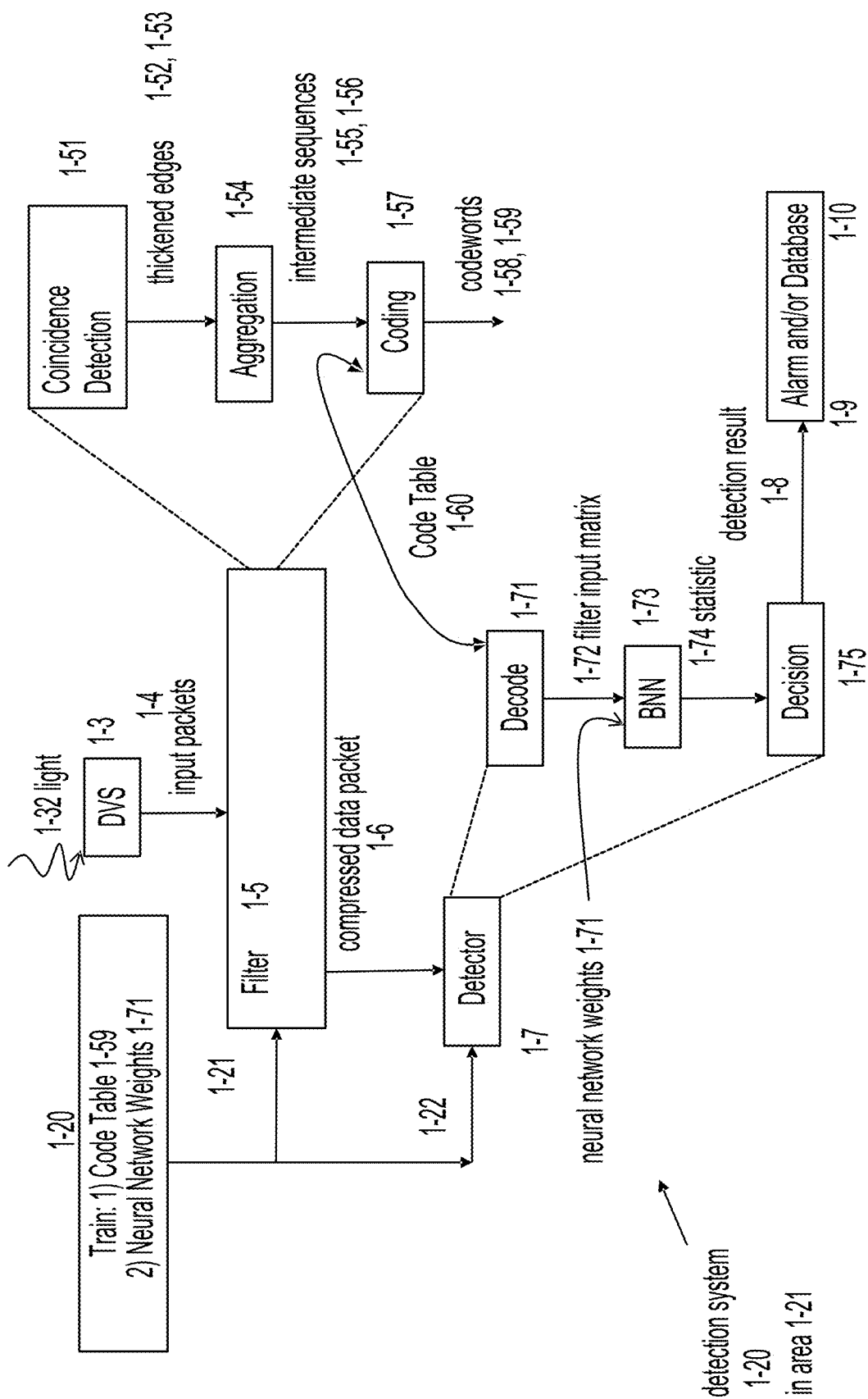
FIG. 1B illustrates further details of the detection system 1-20 of FIG. 1A, according to some embodiments.

FIG. 1B illustrates further information about the detection system 1-20 in area 1-21.

Filter 1-5 includes functions of coincidence detection 1-51, aggregation 1-54 and coding 1-57. The coincidence detection 1-51 produces information representing thickened edges 1-52 (horizontal) and 1-53 (vertical) based on the input packets 1-4. The aggregation function 1-54 operates on the thickened edges to produce intermediate sequences 1-55 (horizontal) and 1-56 (vertical). The coding function 1-57 operates on the thickened edges to produce codewords 1-58 (horizontal), and 1-59 (vertical).

Codewords are placed into a compressed data packet 1-6 and transmitted over a low bandwidth channel 1-40 to the detector 1-7.

The detector includes a decode function 1-71, a binary neural network, (BNN) 1-73 and a decision function 1-75. The decode function operations on the codewords to produce a filter input matrix 1-72. The BNN operates on the filter input matrix 1-73 using neural network weights 1-71 and produces a statistic 1-74. The statistic may in general include one or more values (the statistic may be a scalar or a vector).

The decision function 1-75 operates on the statistic to produce a detection result 1-8. The detection result may indicate that nothing was found by the detector. On the other hand, the detection result may indicate that a person, animal or object 1-1 has been detected by the system 1-20 in the area 1-21. In the latter case the detection result 1-8 is the basis of an alarm 1-9 (or an indication 1-11 in the database 1-10).

The filter 1-5 is trained as shown by the item 1-20 which represents an activity, not a hardware block. 1-20, The training activity 1-20, in some embodiments, occurs on a server. Inference (detection) may be performed by a computing device such as a mobile phone, tablet computer, or server. This training may be off-line training performed before generation of any alarm 1-9 or indication 1-11 or the training may be ongoing.

The training has two aspects. A code table 1-60 used both in the filter 1-5 and in the detector 1-7 is trained. This code table 1-60, in some embodiments, implements a Huffman code. A second aspect is training of the neural network weights 1-71 in the recursive neural network (BNN) 1-73 of the detector 1-7.

Federated learning may be used to determine one or both of the code table and the neural network weights. Example time intervals for update of the code table and/or the neural network weights are once per day, once per week or once per month.

The filter 1-5 may be mounted with the DVS 1-3. In an embodiment, DVS and filter provide near-chip dynamic vision filtering for low-bandwidth pedestrian detection. The filter 1-5 and DVS 1-3 may be mounted in an electronic apparatus such as a mobile phone.

Figure 2:
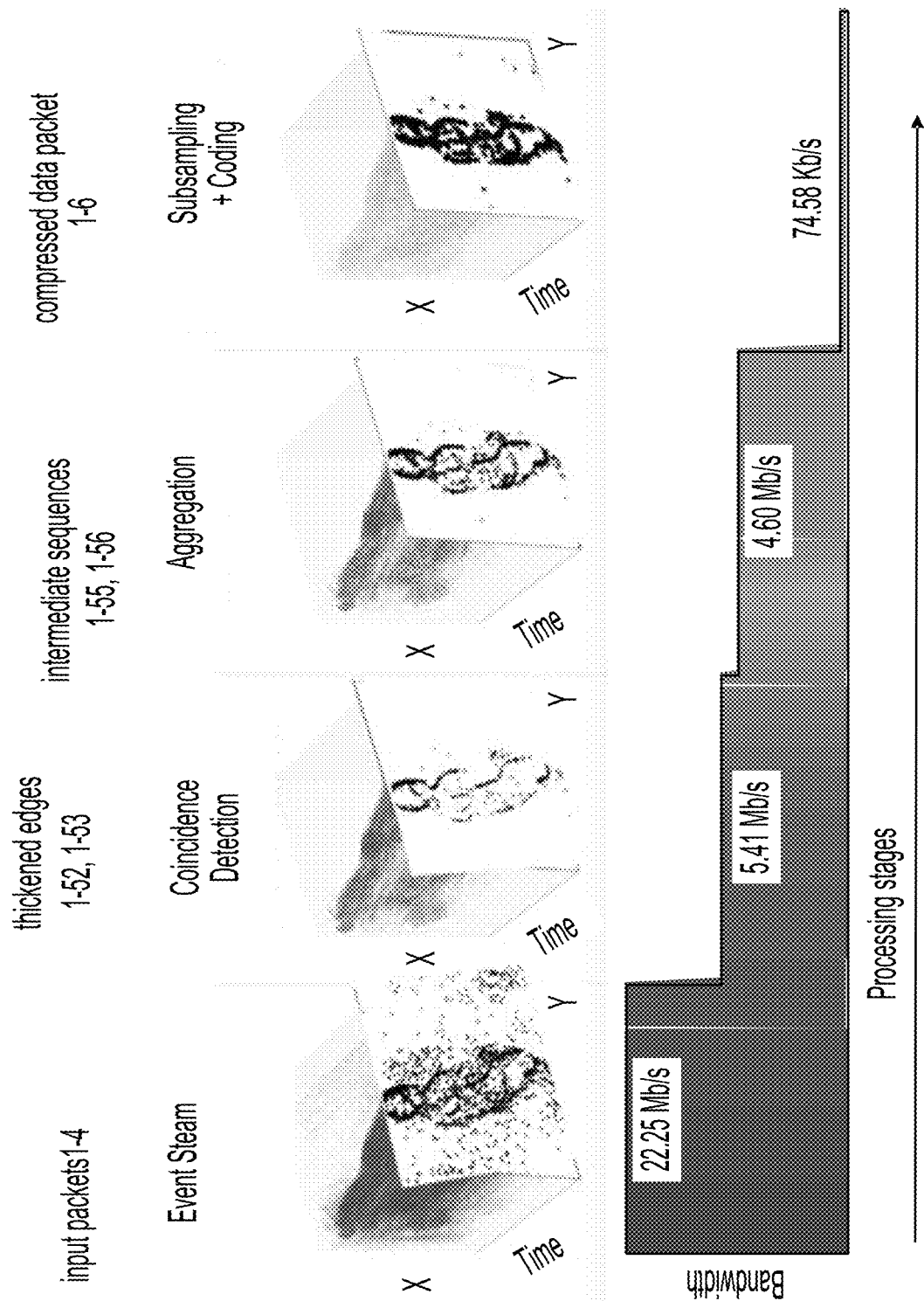
FIG. 2 illustrates bandwidth reduction based on compression operations of a filter of the detection system 1-20, according to some embodiments.

FIG. 2 represents, as an example, an IOT deployment for reduction of bandwidth. FIG. 2 illustrates schematically reduction of bandwidth of information during the processing stages in the filter 1-5 to prepare compressed packets for the low bandwidth channel. Input packets 1-4 arrive and represent an event stream from one or more DVSs. In an example, the event stream has a bandwidth of 22.25 Mb/s (megabits per second). The filter 1-5 processes the input packets 1-4 to produce thickened edges 1-52, 1-53 having a bandwidth in terms of information flow of 5.41 Mb/s. The filter 1-5 processes the thickened edges by aggregation to produce intermediate sequences representing an information flow of 4.60 Mb/s. Finally, the intermediate sequences are processed by coding function 1-57 to produce compressed data packets 1-6 with an information flow, in this example, of 74.58 kb/s (kilobits per second). Additional fields may be present, such as for example a header and/or checksum. In this example, the filter 1-6 has compressed the information flow by a ratio of approximately 250 to 1 ($22 \times 10^6$ to $75 \times 10^3$). Generally, if the bandwidth of the input packets 1-4 is reduced due to low motion or no motion of 1-1, the bandwidth of the compressed packets 1-6 will be less than the 75 kb/s shown in FIG. 2. A typical size, in some examples, of a compressed data packet 1-6 is 1397 bits.

Figure 3:
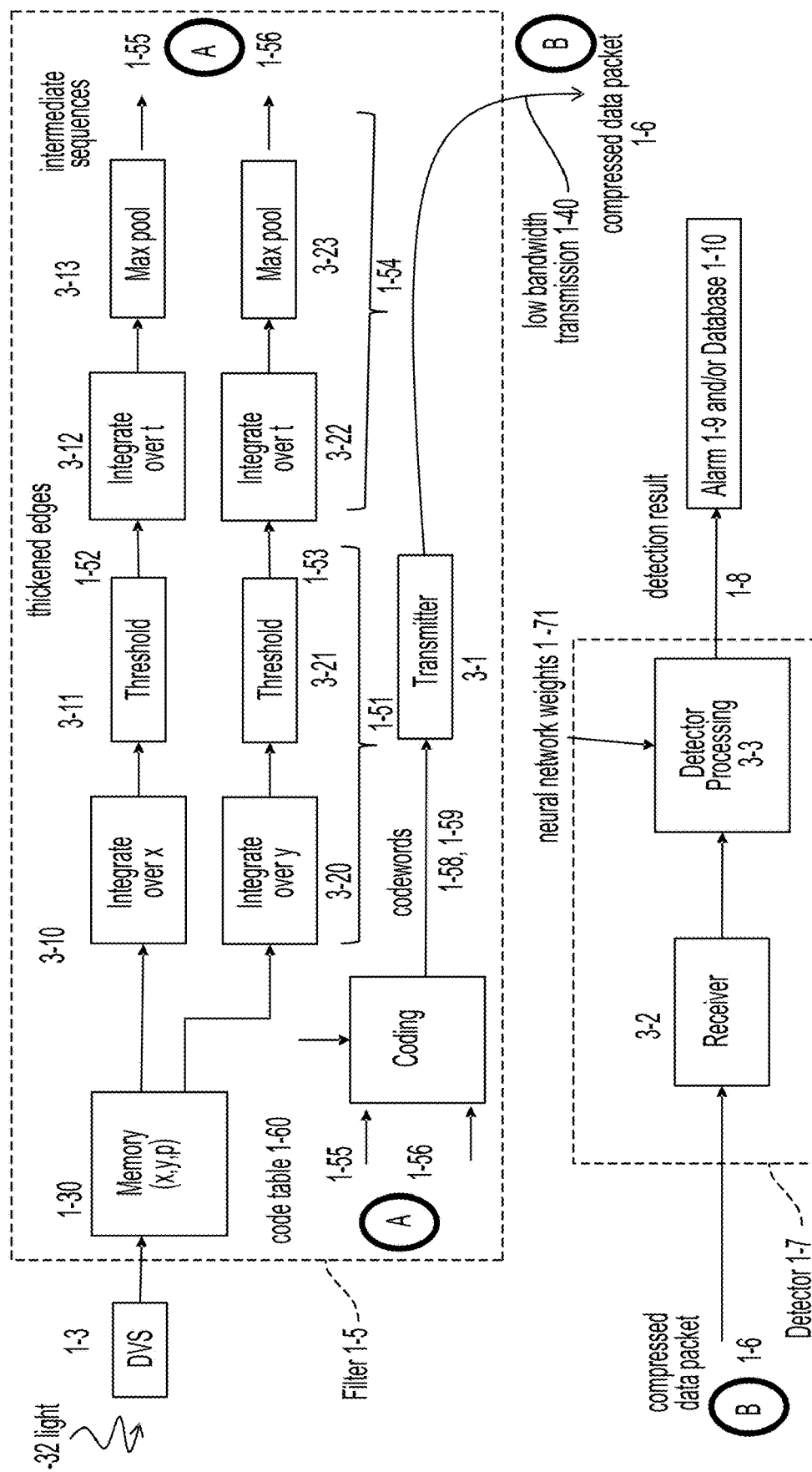
FIG. 3 illustrates further details of the detection system 1-20, according to some embodiments.

FIG. 3 illustrates further details of the filter 1-5 and the detector 1-7. In the filter 1-5, an arriving input packet 1-4 is stored in a memory 1-30. Each entry of the input packet represents a pixel position (x,y) and a polarity (p). This 3-tuple is stored in the memory 1-30 for each pixel reported in the input packet 1-4. In some embodiments, the time value of the 3-tuple is discarded. In general, only pixels having a light intensity change are reported by the DVS 1-3. The DVS decides, in some embodiments, when to send a packet to the detector on the following basis of a change of a logarithm of light intensity, $\Delta \log I \geq C$. For example, in some embodiments, when the change in intensity value on a log scale is greater than some threshold, the corresponding packets will be sent to the detector.

In the detector, data from the memory is processed along two paths: one path represent horizontal compression by processing one row of the memory 1-30. In the horizontal processing, the detector integrates over x (the horizontal dimension), and compares the result of the integration with a threshold. Each time the threshold is crossed, a thickened edge is indicated in the data labelled as 1-52. The thickened edges are then integrated (counted) and are downsampled by a max-pool operation. The result is the intermediate sequence 1-55. Similar operations are performed on columns of the memory 1-30 to produce thickened edges 1-53 and intermediate sequence 1-56.

Overall, embodiments store packets in the event memory. In a first step, a column line buffer is read out which is used by both the vertical and horizontal filter. These filters perform a logical and operation across adjacent pixels in either the vertical or horizontal direction. Embodiments then apply a threshold which determines whether or not the result of the filter is 1 or 0. This produces two spatially filtered streams. After this step each stream goes through aggregation where, the streams are placed in an event memory over multiple time steps. Embodiments use an event threshold and frame counter, to prevent sending noisy images to the detector, hence the event counter makes sure a certain number of pixels are present and the frame counter makes sure to integrate up to only a certain number of frames. Otherwise embodiments will clear the frame buffer memory and start the integration process over. After this, embodiments apply a max pooling. In some embodiments, the max pooling is an 8×8 block operation, hence embodiments store both of the spatial streams in a block memory layout rather than column or row. Therefore, by reading a memory index, a value is read from memory which is a 64 bit number which represents this 8×8 region and due to the max pooling and embodiments only have to compare the 64 bit number against 0 to determine activity, since the output is Boolean. After this, embodiments apply the Huffman codes for the two spatially down sampled streams.

For example, pseudo code for exemplary logic of the coincidence detection 1-51 is provided in the following Table 1.

TABLE 1

Coincidence Detection Pseudo Code.

| | |
|---|---|
| Storage Phase | Storage Phase is run during the transmission of a single DVS frame, after one frame move to next phase |
| 1 | Take in a pixel from the event parser module and |
| 2 | store in a block memory, where polarity is a two bit value(00 None Active, 10 Positive Polarity, 01 Negative Polarity) |
| Computation Phase | The Computation phase is run after a full DVS frame has been transmitted and stored in the block memory |
| 1 | Load into a line buffer, columns (i, i + 1) |
| 2 | [Stream 1] Perform a logical and operation across rows or adjacent pixels [Stream 2] Perform a logical and operation across column of adjacent pixels |
| 3 | Map Values using this logic table, 00 –> 0, 10 –> 1, 01 –> 1 |
| 4 | Send over active values (X, Y) to the aggregation module |

For example, pseudo code for exemplary logic of the aggregation-downsampling 54 is provided in the following Table 2.

TABLE 2

Aggregation-Downsampling Pseudo Code.

| | |
|---|---|
| Aggregation Phase | Aggregate Phase |
| 1 | Send beginning of frame signal when a new DVS frame has arrived, increment frame counter |

TABLE 2-continued

Aggregation-Downsampling Pseudo Code.

| | |
|---|---|
| 2 | (X, Y) pixel is send into the module, and the memory partition module calculates where the pixels will be stored using a block memory format |
| 3 | Check for the given (X, Y) pixel if it has already been written to memory, if so do nothing, if not increment the event counter and store the pixel in the block memory as a single bit |
| 4 | Check for end of frame signal, if active, check event counter > threshold_A and frame_count |

| Readout Phase | |
|---|---|
| 1 | Loop over each block memory cell containing 64 bits (8 × 8 max pool window), |
| 2 | Perform a comparison against 0 |
| 3 | Send over full binary string of maxpooled frame in 8 bit packets each clock cycle |

The intermediate sequences are then parsed into groups of bits, and coded. In an embodiment, the coding uses a Huffman code. Coding of 1-55 leads to codewords 1-58, and coding of 1-56 produces codewords 1-59. A compressed data packet is then composed with a payload of codewords. In some embodiments, the compressed data packet includes a preamble for example of 32 bits and a checksum for example of 32 bits. The compressed data packet is then transmitted by a transmitter 3-1 over a network. The transmitter may be by an inter-chip standard, a network standard implemented by a local area network interface card, or by a wireless transmitter such as Wi-Fi, Bluetooth, LTE or another wireless standard.

The compressed data packet 1-6 is received at a receiver 3-2 of the detector 1-7. The receiver 3-2 corresponds to the transmitter 3-1 in terms of the physical layer interface. Detector processing 3-3 of the detector 1-7 then operates on the output of the receiver to produce the detection result 1-8. In an example, the detector processing 3-3 includes decode function 1-71, BNN 1-73 and decision function 1-75.

Figure 4A:
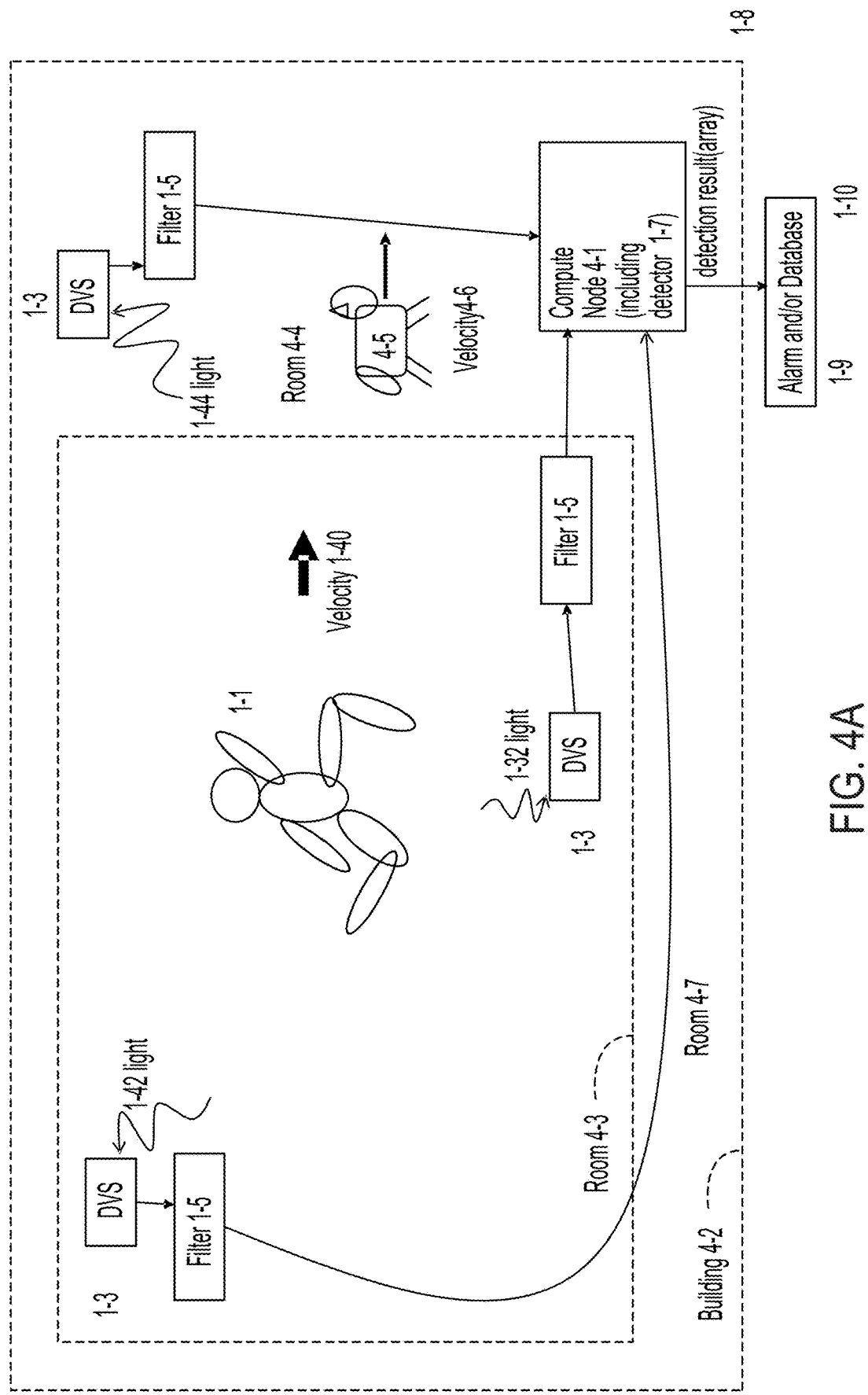
FIG. 4A illustrates a deployment scenario in rooms of a building, according to some embodiments.

FIG. 4A illustrates an in-building deployment scenario of the detection system 1-20. In FIG. 4A, multiple areas are represented. FIG. 4A illustrates a room 4-3 and a room 4-4 in a building 4-2. Several DVS's are deployed in the building 4-2. Inside the building there is a person 1-1 and an animal 4-5. The person 1-1 is moving with velocity 1-40 and the animal is moving with velocity 4-6. Various beams or moieties of light arrive at the various DVS's. Each DVS 1-3 provides its output to a filter 1-5. Each filter 1-5 provides compressed data packets 1-6 to a compute node 4-1. The compute node 4-1 associates geographic labels with each arriving packet according to the DVS from which it originated.

The code table 1-60 and the neural network weights 1-71 work together to detect an object of interest. The code table 1-60 and the neural network weights 1-71 are trained for the object of interest to detect. The training may be for a person, and an animal or an object. Depending on the training, for FIG. 4A, detection result 1-8 will correspond to the person 1-1 in room 4-3 or detection result 1-8 will correspond to animal 4-5 in room 4-4. Numerous detection results are indicated in FIG. 4A with the label "(array)."

Figure 4B:
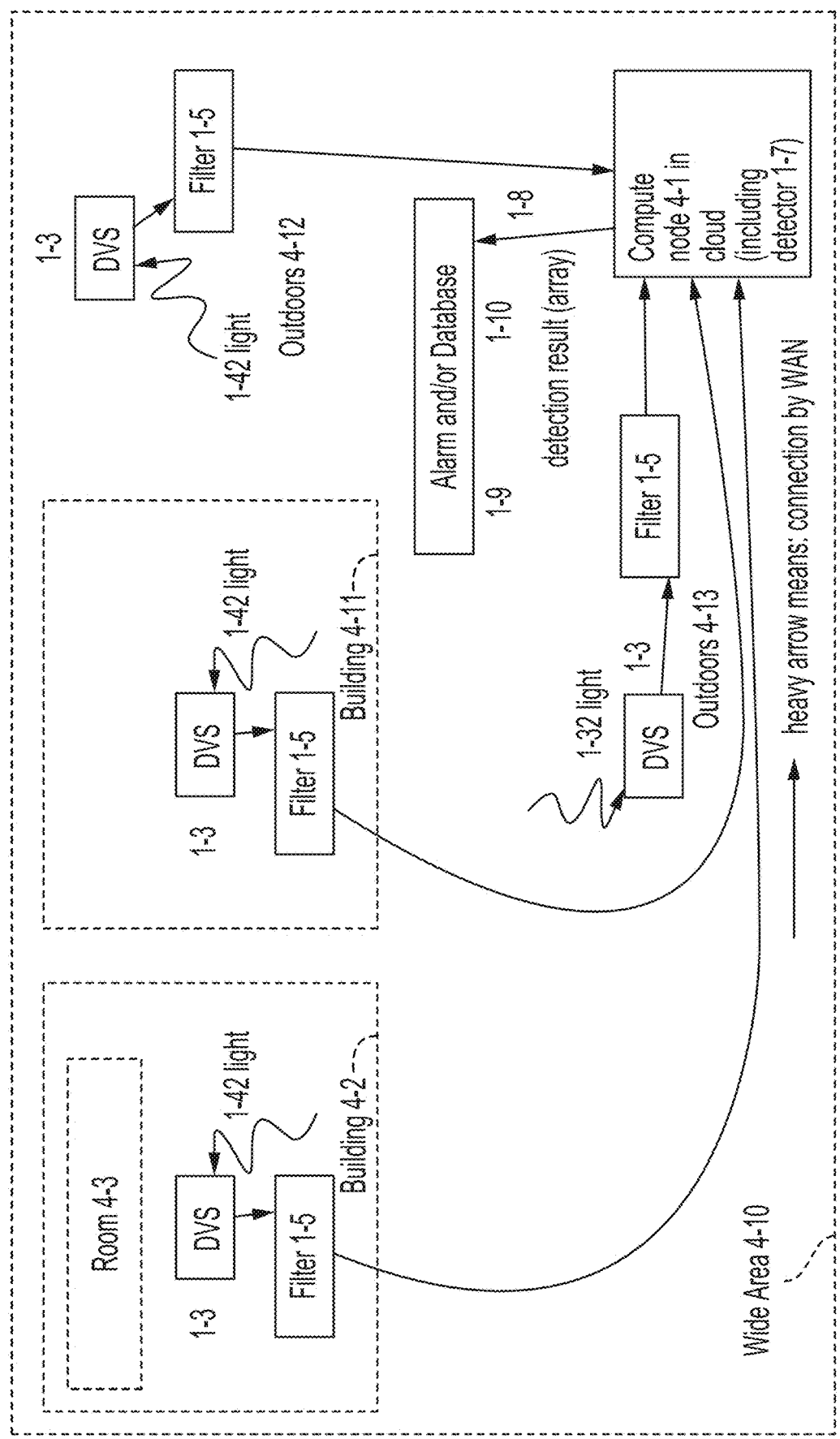
FIG. 4B illustrates a detection system 1-20 with multiple building and multiple outdoor areas, according to some embodiments.

FIG. 4B illustrates a multiple building and outdoor deployment scenario of the detection system 1-20. Wide area 4-10 is illustrated. Wide area 4-10 in an example, is a city. Building 4-2 and building 4-11 are in the city, for example. Building 4-2 may be a single family home or an apartment in a multi-family building. DVS's may also be deployed in outdoor areas 4-12 and 4-13. The various filters of FIG. 4B provide compressed data packets 1-6 to a compute node 4-1. In an example, processing resources and memory for compute node 4-1 are provided in a cloud. A cloud is a collection of servers and memories, portions of which may be configured to implement a virtual machine. Subscribers to the cloud service request virtual machines with various capabilities. In an embodiment, compute 4-1 is a virtual machine. In another embodiment, compute node 4-1 is a dedicated server, memory and/or database.

In FIG. 4B, each different filter may be trained for different objects of interest in each different local area. The corresponding different code table and neural network weights for each different filter are then invoked in the compute node 4-1 to produce different detection results 1-8. The numerous detection results are indicated with the label "(array)."

As a brief aside, general comments are given here on DVS technologies. Later, further details of the system 1-20 are provided below.

General

DVS technologies hold the potential to revolutionize imaging systems by enabling asynchronous, event-based image acquisition. DVS pixels generate and transmit events only when there is a change in light intensity of a pixel. This approach has many advantages compared to Conventional Image-based Sensors (CIS), such as: (i) higher dynamic range, (ii) higher frame rates, (iii) lower bandwidth requirements between the sensor and the processing unit, and (iv) lower power consumption. These characteristics make DVSs attractive sensors for energy-constrained scenarios such as the Internet of Things (IoT) applications.

Figure 10:
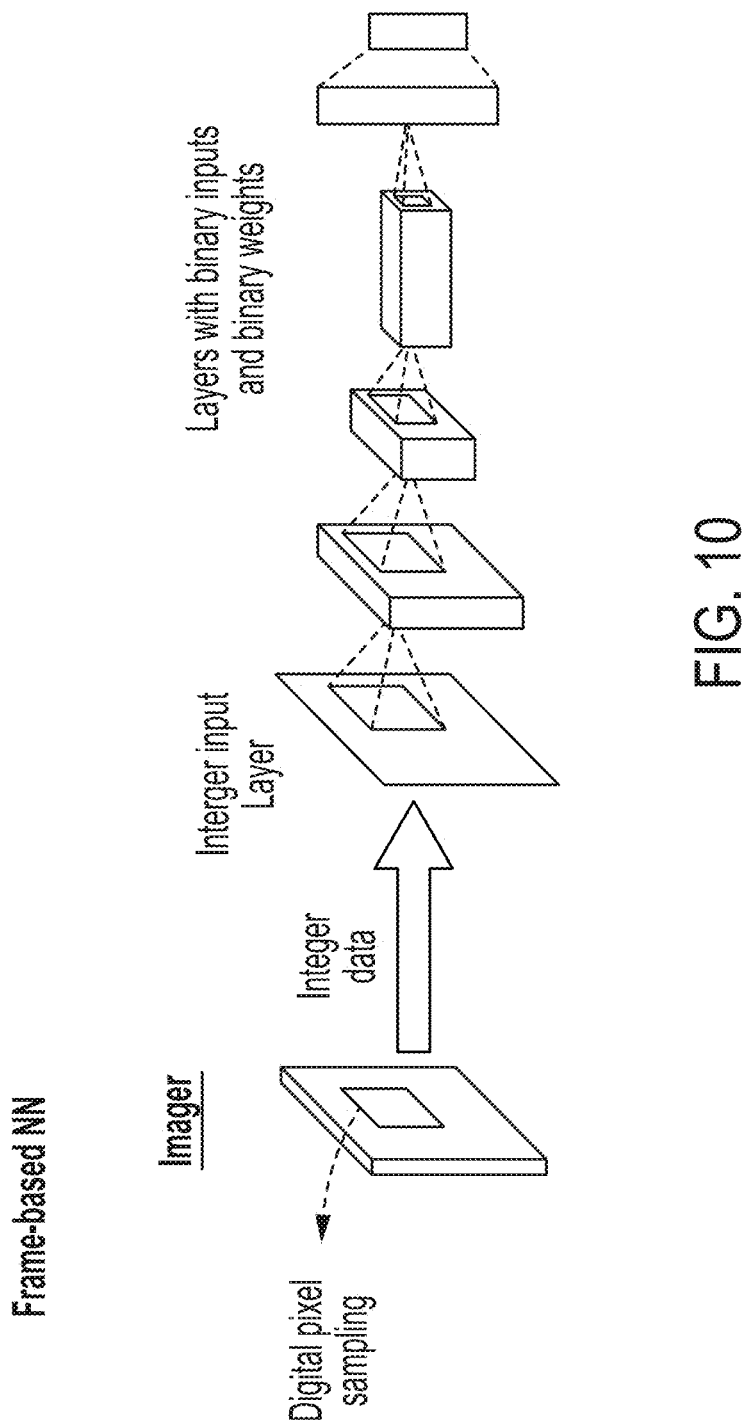
FIG. 10 illustrates related art of a frame based neural network receiving integer data.

Current solutions to pedestrian detection using sensors involve streaming data from a CIS to a processing module that runs the detection algorithm. See the frame-based Neural network processing of FIG. 10, which requires transmission of high bandwidth integer data. Since the raw data from the imaging sensor can be high, in for example the arrangement of FIG. 10, usually the images are compressed before transmission. This approach (i) requires a large bandwidth or low frame rate to stream the data, and (ii) raises inherent privacy concerns, as streamed images may be accessed by malicious third-party actors.

IoT (Internet of Things) applications require low energy consumption due to their strict energy budgets. The asynchronous and low-bandwidth nature of event cameras make them suitable. However, DVS sensors are inherently noisy, making application of DVS challenging.

As discussed above, FIG. 2 illustrates an IoT system with DVS for near-device classification. The bandwidth required to transmit the low-bandwidth stream is significantly lower than a compressed video stream such as H.265.

Further Description of the System 1-20

FIG. 3 illustrates an example of a near-chip DVS filter architecture in stages, according to one embodiment. A reduction of the required bandwidth through the different stages of the filter, as well as a sparser event stream, is provided as indicated in FIG. 2. The privacy of persons represented in the input packets 1-4 is provided by lossy subsampling created by the integration and threshold stages (the resulting data indicates a person, but not a particular person).

Various embodiments provide an end-to-end system for pedestrian detection (FIGS. 1, 4A and 4B) using DVSs: (i) one embodiment comprises a near-chip event filter that compresses and denoises the event stream from the DVS (FIG. 3) and (ii) one embodiment comprises a Binary Neural Network (BNN) detection module that runs on a low-computation edge computing device. The first embodiment reduces transmission size substantially, compared to transmitting the raw event stream, with small average packet size.

Embodiments use a low bandwidth for transmitting the intermediate representations between the sensor and the processing platform. Embodiments also enhance privacy because of lossy subsampling, and the original event representation cannot be recovered by an eavesdropper. In some embodiments, the detector is able to perform a detection every 450 ms, with an overall testing FI score of 83%.

In the filtering module, a network-aware system runs near chip, according to one embodiment. It denoises the DVS stream by the operations shown in FIG. 3 and compresses the data for further downstreaming processing. The input of this module is the raw event stream issued from the sensor (input packets 1-4), and the output is a Huffman coded event stream (compressed data packets 1-6), according to one embodiment. In the detection module, the coded event representation is received from the filtering module. It performs decoding and pedestrian detection.

In one embodiment, the filtering module includes four submodules, Event Parsing, Coincidence Detection 1-51, Aggregation-Downsampling (1-54), and the Huffman encoder (1-57). In one embodiment, the DVS is connected directly to a field programmable gate array (FPGA), which is responsible for processing the events in a G-AER packet format.

In one embodiment, the event parsing submodule translates the G-AER representation of the sensor to a (x, y, p) representation, where x and y are the row and column addresses of the pixel, and p is the polarity encoded with two bits.

DVS pixel arrays are susceptible to background activity noise, which is displayed as impulse noise when DVS events are observed in a finite time window. Noisy pixels will be isolated compared to signal pixels, and thus may be removed by observing pixel activations over space or time. In one embodiment, the coincidence detection submodule detects tuples of active pixels in the vertical and horizontal spatial directions. In one embodiment, this submodule collects events in a predefined time window of length r. Then it performs a logical AND operation between adjacent pixels. One embodiment uses simpler bitwise operations between the pixels instead of a complex integrate-and-fire model, and a coincidence is detected only if two pixels with the same polarity are detected.

In a static DVS application, when binning events in a time window, the thickness of the edge depends on both the velocity of the object and the length of the time window. The function of the aggregation submodule is to increase the thickness of the edge to a normalized size before performing inference. For this, in one embodiment, the aggregation submodule performs successive logical OR operations across the temporal dimension until the number of events in the aggregation frame being above a threshold, according to one embodiment. If the threshold is not achieved in a 5r window, the frame buffer is cleared and no events are propagated.

In one embodiment, after performing the aggregation operation, an 8×8 max-pooling operation is performed to the aggregated time window. In an example, The max-pool operation aims to reduce the scale dependency of the object in the scene, and it reduces the dimensionality of the data. In one embodiment, the subsampling submodule operates asynchronously, only when the aggregation submodule reports new data.

FIGS. 5A, 5B, 5C and 5D illustrate further details of the filter 1-4. The filter 1-4 includes Event Parser 5-1, Coincidence Detection 1-51, Aggregation 1-54, and Coding function 1-57.

Figure 5A:
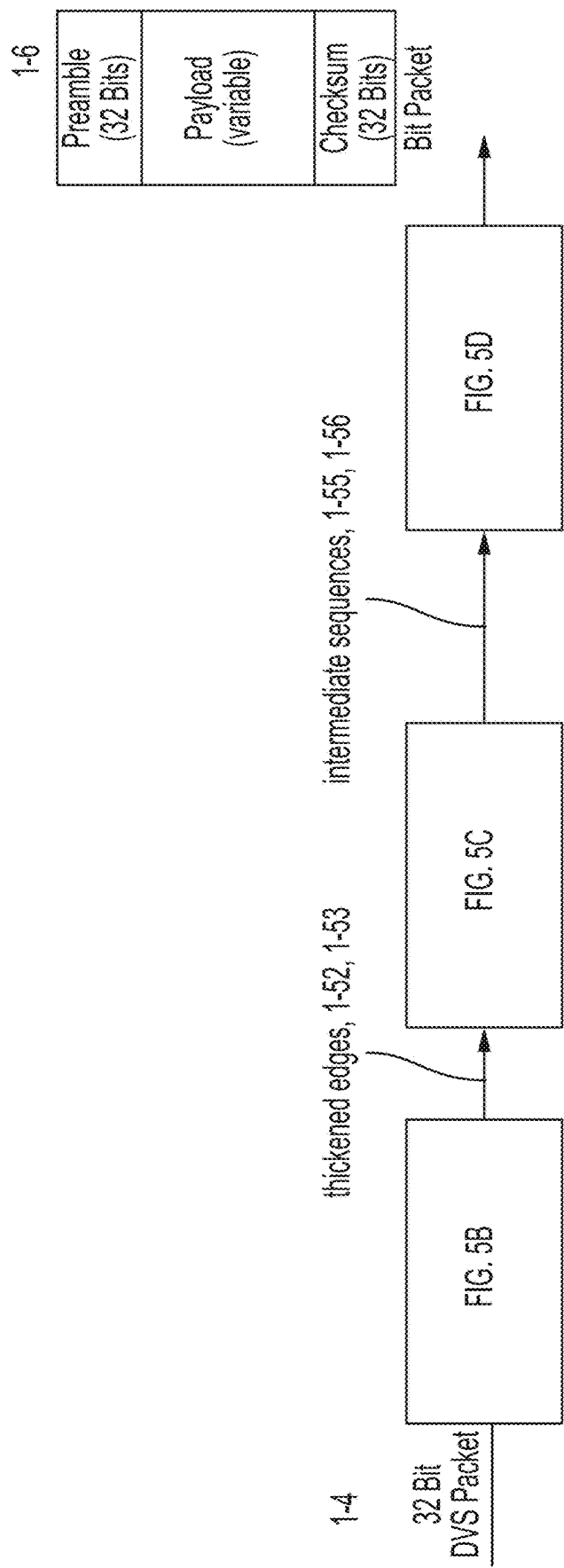
FIGS. 5A, 5B, 5C and 5D provide further details of the filter 1-5, according to some embodiments.
Figure 5B:
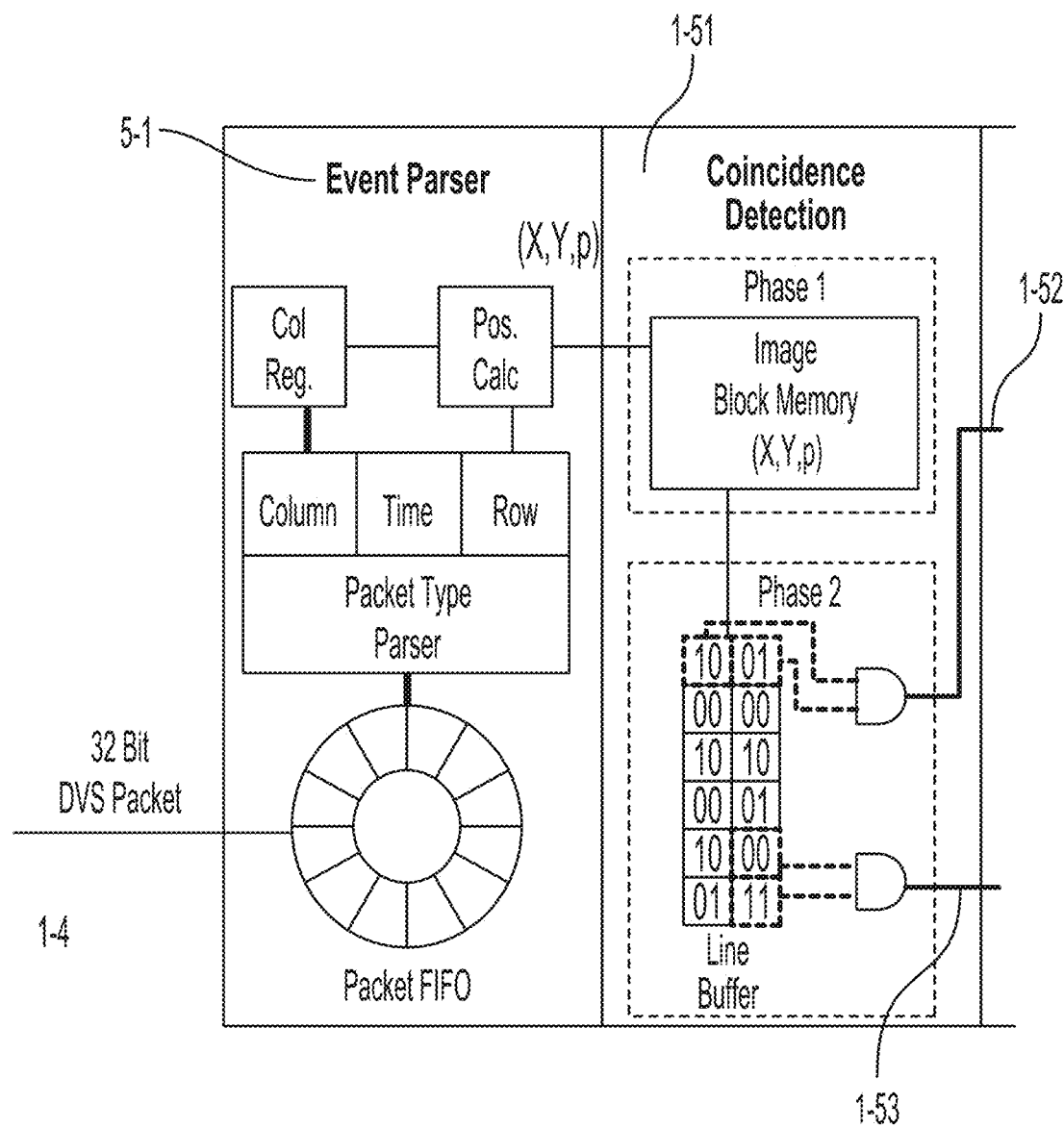
Figure 5C:
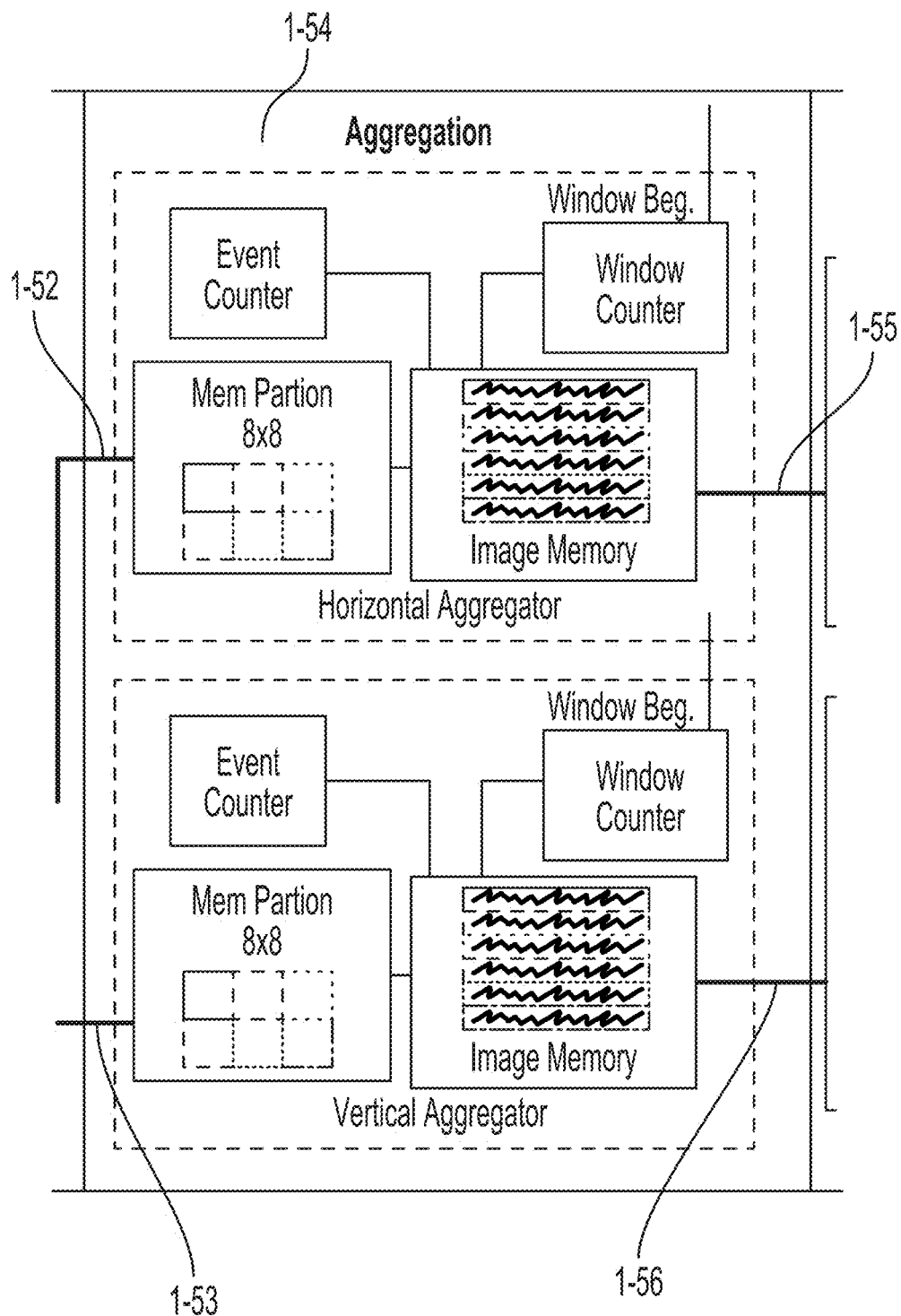
Figure 5D:
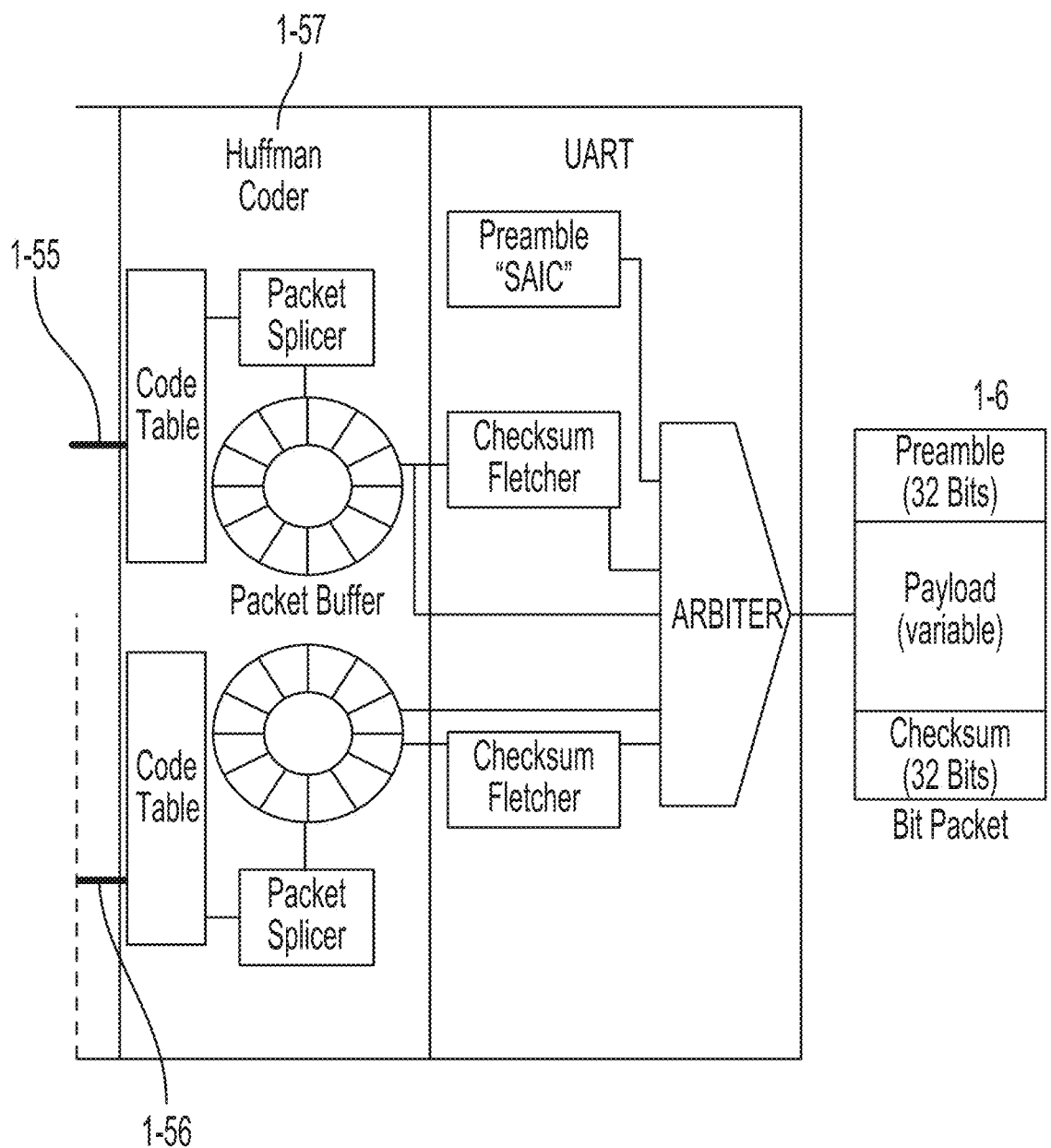

FIG. 5A is an overview figure, showing the relations of the circuits of FIGS. 5B, 5C and 5D.

The event parser 5-1 of FIG. 5B translates the G-AER representation of the sensor to a (x, y, p) representation, where x and y are the row and column addresses of the pixel in the sensor array, and p is the polarity encoded with two bits. While G-AER allows for a significant bandwidth reduction between the sensor and the FPGA, inside the architecture provided herein it is easier to work with the representation described above for memory addressing purposes. The Event Parsing submodule was implemented as an input First-In, First-Out (FIFO) queue capable of storing 256 G-AER events, followed by a LUT-based decoder.

Further to the description above, FIG. 5B illustrates coincidence detection 1-51.

DVS pixel arrays are susceptible to background activity noise, which is displayed as impulse noise when DVS events are observed in a finite time window. Commonly, noisy pixels will be isolated compared to signal pixels, and thus may be removed by observing a sequence of pixel activations over space or time. The filter works by detecting tuples of active pixels in the vertical and horizontal spatial directions. The coincidence detection serves a dual purpose in the architecture: first, it collects events in a predefined time window of length _. Then it performs a logical AND operation between adjacent pixels. Filter 1-5 uses simple bitwise operations between the pixels instead of a complex integrate-and-fire model, and a coincidence is detected only if two pixels with the same polarity are detected. In the architecture, τ=3 ms.

In some embodiments, the coincidence detection is implemented as two discrete memories ($M_0$;$M_1$) each of size 480×320×2 bits. In phase 1, t=n*τ, the memory array $M_0$ starts in a cleared state, and it collects events until t=(n+1)*τ, when the window period has elapsed. In phase 2, from t=(n+1)*τ until t=(n+2)*τ, the memory array $M_0$ is read and the coincidences are evaluated by observing adjacent active vertical and horizontal pixels. At the same time, $M_1$ is collecting the events corresponding to this time window. The output of this submodule is composed of two channels, corresponding to the filter applied in the vertical and horizontal dimensions. Only active pixels are sent, as thickened edges 1-52 and 1-53, to aggregation 1-54 (which may be referred to herein as aggregation submodule).

On an example FPGA, all the memory blocks were implemented with dual-port BRAM slices. In the readout operation, a line buffer of 480 pixels is used to store the intermediate pixels read. The coincidence detection submodule also propagates a signal indicating the start and end of a time window to the aggregation submodule.

Further to the description above, FIG. 5C illustrates aggregation 1-53, which includes subsampling.

In a static DVS application, when binning events in a time window, the thickness of the edge depends on both the velocity of the object and the length of the time window, for example velocities 1-40 and 4-6 (see FIGS. 1 and 4A). The function of the aggregation submodule is to increase the thickness of the edge to a normalized size before performing inference. Inference refers to the operations of the detector 1-7. For this, the aggregation submodule performs successive logical OR operations across the temporal dimension until the number of events in the aggregated frame is above a threshold. If the threshold is not achieved in a 5_time window, the frame buffer is cleared and no events are propagated.

After performing the aggregation operation, an 8×8 max pooling operation is performed to the aggregated time window (items 3-13 and 3-23 of FIG. 3).

The max-pool operation aims to reduce the scale dependency of the object in the scene, and it reduces the dimensionality of the data. The subsampling submodule operates asynchronously, only when the aggregation submodule reports new data (threshold functions 3-11, 3-21). For example, the asynchronous reporting is due to the integrate overt only reporting sometimes, since if the event threshold it not met the stream will not be sent to the next module.

The aggregation submodule 1-54 is configured to independently process each channel (horizontal, vertical) coming from the coincidence detection submodule 1-51. Each pixel streamed into aggregation is stored in the aggregated frame block memory (480×320). At the start of every τ window, a window counter is incremented. This counter is used for implementing the temporal window integration limit of 5τ. Also, an event counter is kept for the number of pixels in the max pooled and aggregated window. At the end of every τ-sized window, the event counter is checked to be above the event threshold (1000 events). Given this condition, the aggregated frame is sent to subsampling.

The subsampling submodule is implemented using a block memory layout. Normally to store an image in memory, a column based layout is used, where pixels are stored sequentially based on columns index. A problem with using column indexing for max-pooling is that for each operation different memory blocks must be accessed. Embodiments use a block memory layout: each memory block stores pixels in the same 8×8 max-pooling area. Hence, a single memory read operation and comparison against 0 can perform max-pooling in a single clock cycle.

Further to the description above, FIG. 5D illustrates an example of a coder 1-57. After aggregation, the output of the filter, in an example, is a discrete packet of 2×60×40 bits, corresponding to the pixel readouts of the downsampled aggregated image, for the vertical and horizontal channel. To further reduce the data bandwidth, in some embodiments a Huffman encoding is performed using a precomputed 256-word dictionary. This dictionary is an example of code table 1-60.

On average, the coding results in a reduction by a ratio of 3.6:1 in payload size for compressed data packet 1.6.

In an example, the Huffman coder is implemented by storing the codeword dictionary in BRAM and doing a lookup over the output of the aggregation submodule. The data is preceded by a 32-bit preamble header, and a low-complexity Fletcher-32 checksum is appended at the end of the packet (FIG. 5D).

For testing purposes, embodiments stream the event representation using an UART serial interface between the FPGA and the detection module. Other communication interfaces may be used. For instance, the same filtering scheme can be supported by inter-chip communication protocols, such as I2C or SPI, as well as other field-bus protocols.

The detector 1-7, also referred to as detection module, is used to perform binary classification for pedestrian detection from the sparse output of the filter. In an embodiment, the detector uses a Convolutional Neural Network (CNN) based architecture with binary weights.

Figure 6:
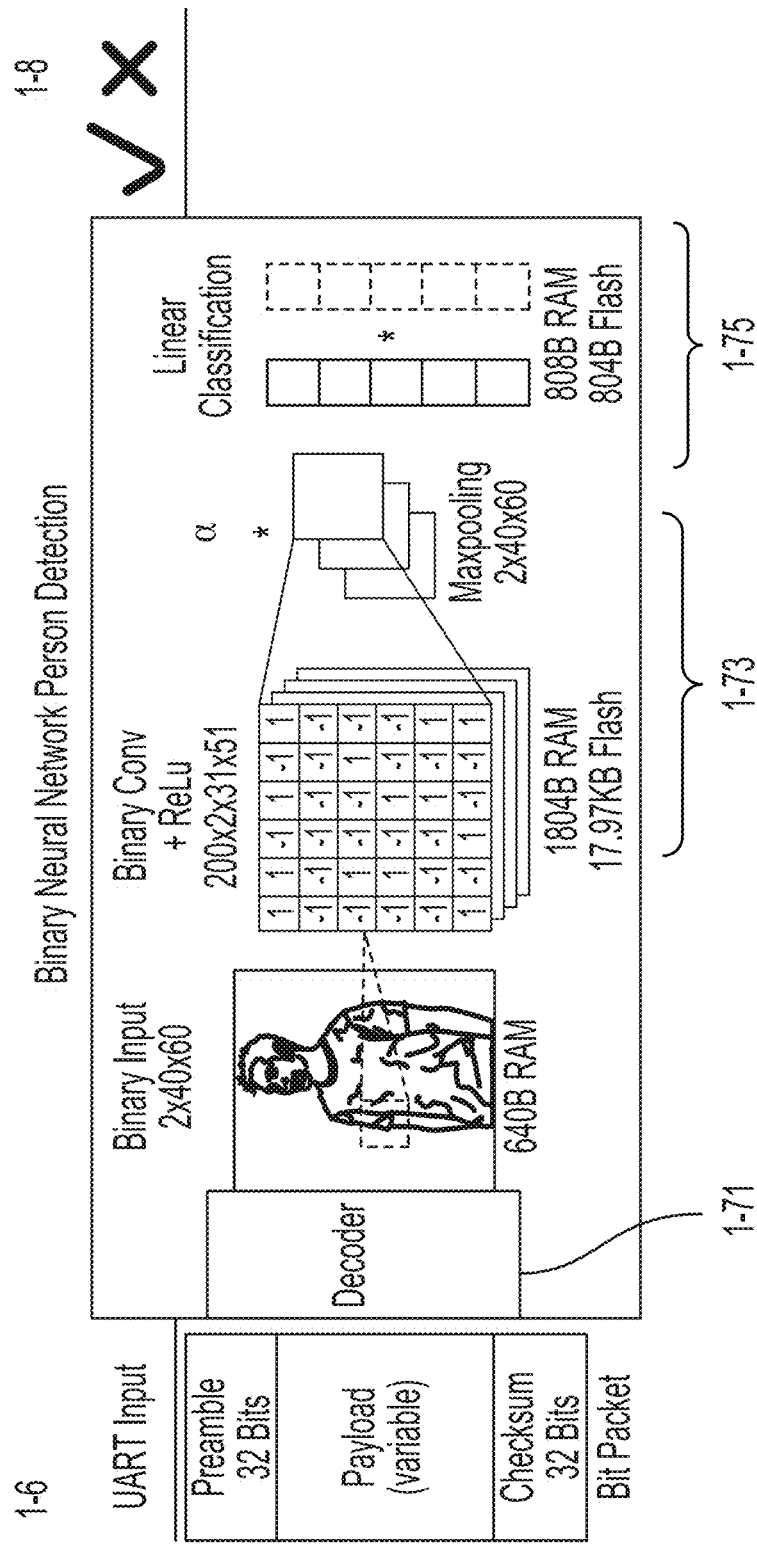
FIG. 6 illustrates further details of the filter 1-5, according to some embodiments.

The network architecture, see FIG. 6, is composed of two hundred 10×10 convolutional filters with binary (+/−1) weights. As the output of the filter is encoded using a binary {0, 1} representation, the convolution operation is implemented as a binary AND operation with the positive and negative convolution filters, followed by a population count operation.

Figure 9:
FIG. 9 illustrates simplified operations in comparison to conventional addition and subtraction, according to some embodiments.
Figure 9:

In some embodiments, to accelerate calculations at the detector 1-7, embodiments use Digital Signal Processing (DSP) single instruction, multiple data (SIMD) instructions, as well as the floating-point unit (FPU) of the Cortex-M4 core. This processor does not have a dedicated population count instruction (popcnt), which is required for the neural network inference process. See the contrast of operation complexity in FIG. 9. Therefore, embodiments implement this operation as a LUT (lookup table) in flash memory. While this approach increases the storage space required, it is a tradeoff for faster execution speeds.

The resulting convolution value is then scaled by a positive factor α, followed by a ReLU (rectified linear unit) nonlinearity, and whole frame max-pooling. The detection value is obtained after a linear readout and thresholding.

The filter and detector provided herein can each be implemented using one or more processors such as CPUs executing instructions from a non-transitory memory, implemented by custom hardware, implemented by one or more application specific integrated circuits (ASICs), and/or implemented by one or more FPGAs or a combination of processors and FPGAs.

Performance

Figure 7:
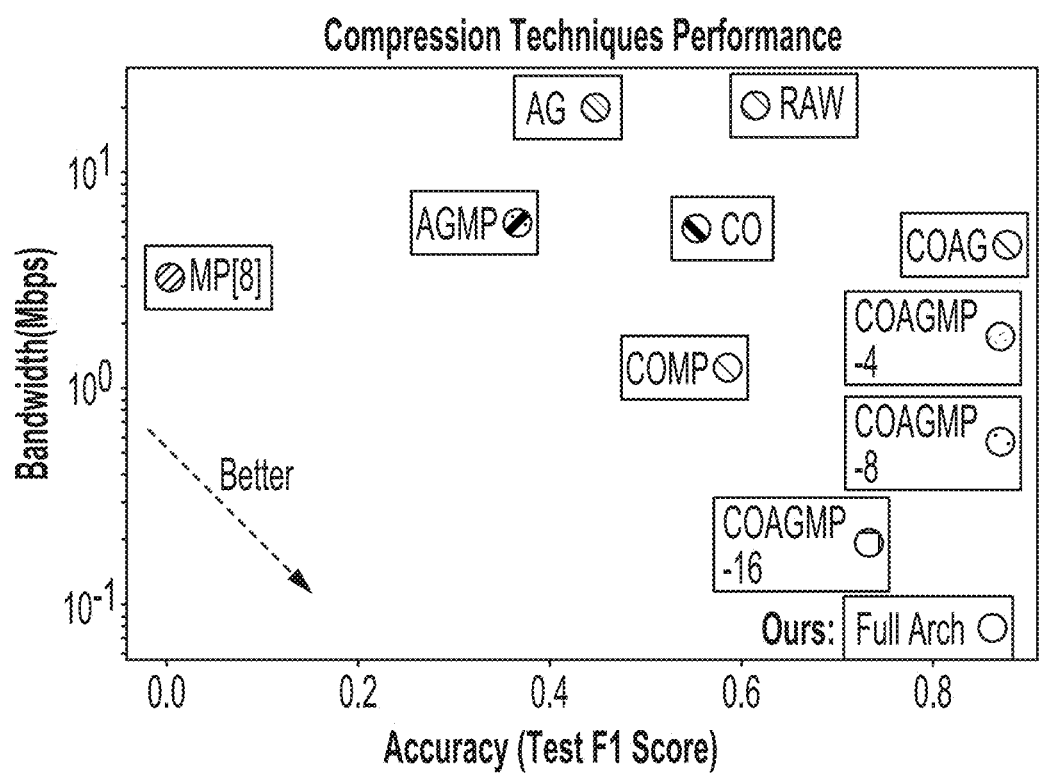
FIG. 7 illustrates relative performance including full architecture processing versus raw processing, according to some embodiments.

Throughout this work various approaches were tested in order to achieve high compression with little reduction in testing accuracy. Please see FIG. 7. The entire pipeline of the filtering module may include: Coincidence Detection (CO), Aggregation (AG), Max Pooling (MP) and Huffman Coding, according to one embodiment. Each of these submodules reduces the bandwidth of the event stream and increases the detection accuracy. FIG. 7 provides F1 as a metric to compare the ablations. F1 score is the harmonic mean between precision and recall scores.

The binary neural network is trained using the full pipeline, and a performance was obtained of a 83% F1 testing score. Additionally, the measured bandwidth after filtering was 74:58 kbps.

The first ablations was removing the coincidence detection submodule. This resulted in lower testing F1 score and higher bandwidth compared to the full pipeline. This shows the effect of the coincidence detection removing noise: DVS noisy events increase bandwidth, and noisier images are harder to detect.

The second ablation was removing the aggregation submodule. This resulted in the testing F1 score was smaller and the output bandwidth of the filter was higher. Higher bandwidth is due to the additional frames from not temporally filtering.

A lower testing F1 score without aggregation is due to less defined features for shallow learning using BNNs.

The third ablation was changing the max-pooling size. The default value used in the pipeline was 8×8. When increasing this default value, bandwidth decreased and testing F1 score decreased. This is due to the lack of features due to the large dimensionality reduction. As for decreasing the max-pooling size, bandwidth increased, yet performance increased by little (near 1%). This performance increase was small enough, that some embodiments incur this trade off for a smaller bandwidth model. The filter is capable of processing data as fast as the coincidence detection window, resulting in the bandwidth of 74:58 kbps. The bandwidth may be further reduced by temporally downsampling the detection rate, through a refractory period mechanism. For instance, if the filter produces an output every 100 ms the final required bandwidth is 2:23 kbps on average (when some time windows are not propagated due to low event counts), and at most 13:97 kbps. This enables the use of the architecture provided herein on IoT applications using low rate wireless standards such as 802.15.4 (C/LM-LAN/MAN Standards Committee, "802.15.4-2015—IEEE Standard for Low-Rate Wireless Networks," https://standards.ieee.org/content/ieee-standards/en/standard/802 15 4-2015.html, 2015) and LoRA and NB-IoT.

FIG. 7 illustrates a testing F1 score and bandwidth tradeoff between different compression pipelines. The labels in FIG. 7 refer to: Coincidence Detection (CO), Aggregation (AG), Max Pooling (MP-#) with the max pooling ratio indicated after the dash. The full architecture is COAGMP-8+Huffman Coding.

What is claimed is:

1. A filter device comprising:
   a sensor input configured to receive a plurality of input packets from a dynamic vision sensor (DVS), wherein the DVS is configured to output a plurality of pixel values;
   a coincidence detector configured to generate a plurality of thickened edges based on the plurality of input packets, wherein the plurality of thickened edges comprises a first thickened edge, and the first thickened edge indicates a coincidence between a first pixel value and a second pixel value of the plurality of pixel values, and the coincidence is detected by identifying that the first pixel value and the second pixel value have a same detected polarity;
   an aggregator configured to obtain a packet payload based on event counts of the plurality of thickened edges; and
   a transmitter configured to output a compressed data packet, wherein the compressed data packet is based on the packet payload.

2. The filter device of claim 1,
   wherein the coincidence detector is configured to:
   receive the plurality of pixel values, wherein the plurality of pixel values are based on the plurality of input packets,
   detect a plurality of horizontal coincidence values,
   detect a plurality of vertical coincidence values, and
   output the plurality of horizontal coincidence values and the plurality of vertical coincidence values.

3. A method comprising:
   receiving a plurality of input packets from a dynamic vision sensor (DVS) by a sensor input, wherein the DVS is configured to output a plurality of pixel values;
   generating, by a coincidence detector, a plurality of thickened edges based on the plurality of input packets, wherein the plurality of thickened edges comprises a first thickened edge, and the first thickened edge indicates a coincidence between a first pixel value and a second pixel value of the plurality of pixel values, and the coincidence is detected by identifying that the first pixel value and the second pixel value have a same detected polarity;
   obtaining a packet payload based on event counts of the plurality of thickened edges by an aggregator; and
   transmitting, to a detector, a compressed data packet, wherein the compressed data packet is based on the packet payload by a transmitter.

4. The method of claim 3,
   wherein the generating the plurality of thickened edges by the coincidence detector comprises:
   receiving the plurality of pixel values, wherein the plurality of pixel values are based on the plurality of input packets,
   detecting a plurality of horizontal coincidence values,
   detecting a plurality of vertical coincidence values, and
   outputting the plurality of horizontal coincidence values and the plurality of vertical coincidence values.

5. The method of claim 4,
   wherein the obtaining the packet payload based on event counts of the plurality of thickened edges by the aggregator comprises:
   downsampling the plurality of horizontal coincidence values to obtain a plurality of downsampled horizontal values,
   integrating the plurality of downsampled horizontal values to generate a plurality of horizontal event values,
   downsampling the plurality of vertical coincidence values to obtain a plurality of downsampled vertical values, and
   integrating the plurality of downsampled vertical values to generate a plurality of vertical event values.

6. The method of claim 5, further comprising:
   outputting a coded packet based on a code table, the plurality of horizontal event values and the plurality of vertical event values by a Huffman coder,
   wherein the compressed data packet is based on the coded packet.

7. The method of claim 6, further comprising:
   outputting the compressed data packet including a first preamble, the coded packet, and a first checksum by a wired interface.

8. The method of claim 7, further comprising:
   outputting the compressed data packet including a second preamble, the coded packet, and a second checksum by a wired interface.

9. The method of claim 8, further comprising:
   determining the plurality of pixel values based on the plurality of input packets, and outputting the plurality of pixel values to the coincidence detector by an event parser,
   and wherein the first pixel value of the plurality of pixel values includes an x value, a y value and a p value, wherein the x value is a row value, the y_value is a column value, and the p value is a polarity value.

* * * * *